Sept. 22, 1925. 1,554,802
A. DYER
FINGER BOARD FOR STRINGED INSTRUMENTS
Filed May 17, 1923

INVENTOR
A. Dyer

Patented Sept. 22, 1925.

1,554,802

UNITED STATES PATENT OFFICE.

ALFRED DYER, OF TORONTO, ONTARIO, CANADA.

FINGER BOARD FOR STRINGED INSTRUMENTS.

Application filed May 17, 1923. Serial No. 639,577.

*To all whom it may concern:*

Be it known that I, ALFRED DYER, of the city of Toronto, county of York, Province of Ontario, Canada, a subject of the King of Great Britain, have invented certain new and useful Improvements in Finger Boards for Stringed Instruments, of which the following is a specification.

My invention relates to improvements in finger boards for stringed instruments, and the object of my invention is to enable students of stringed instruments after little practice, to produce tremulous or pulsating sound waves, without necessarily having to give the usual wrist motion now required in producing the type of sound wave mentioned, and in the following specification I shall describe a disclosure within my invention, and what I calim as new will be set forth in the claims forming part of this specification.

Figure 1:
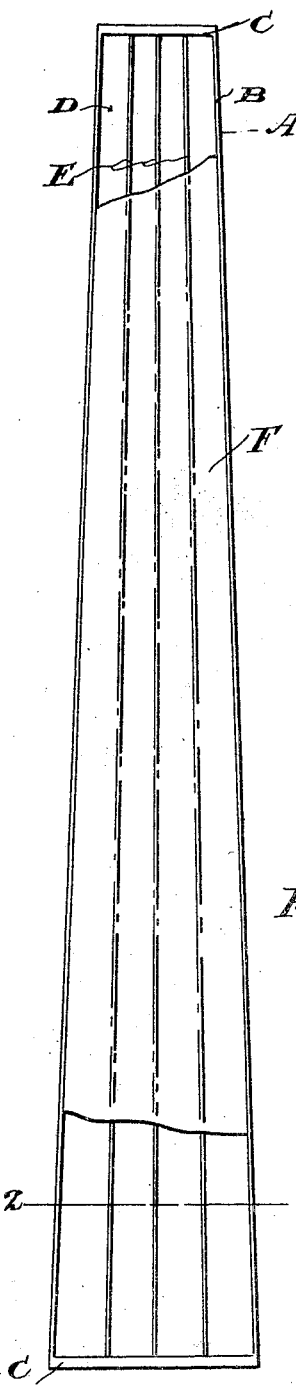
Figure 2:
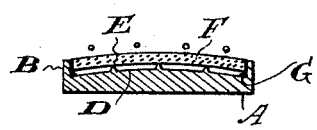
Figure 3:
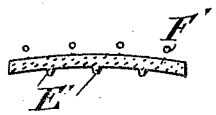

Fig. 1 is a plan view of a finger board within my invention, portion thereof broken away. Fig. 2 is a cross-section on the line 2—2, Fig. 1, and Fig. 3 is a cross-section through the resilient covering for the finger board, showing a modified form of my invention.

In the drawings, like characters of reference refer to the same parts.

The finger board A may be made of any suitable material, and the same is preferably provided with lateral flanges B and end flanges C, which project above the upper surface D of the said finger board, and so form a chamber. Extending longitudinally of said finger board, and projecting above the upper surface D thereof, are a plurality of projections or ribs E, which are spaced apart. Placed upon the ribs or projections E, is a resilient covering F, made of rubber or rubber compound, or the equivalent thereof, and the ends and sides of said covering F are, in the disclosure herein, protected by the lateral and end flanges B and C. The said resilient covering is suitably secured in place. Cement G may be employed for this purpose at the location shown.

The strings of the instrument will be normally above the outer face of the resilient covering F, approximately in the position shown in Fig. 2, and between the ribs or projections E.

In place of providing the finger board A with the ribs or projections E, I may provide a modified form of resilient covering as shown at F' in Fig. 3, provided on its inner side with the projections or ribs E', which will be adapted to rest against the upper surface of the finger board A. In this modified form of covering the strings of the instrument are also located between the said projections or ribs E'.

The said projections or ribs will keep the major portion of the underside of the resilient covering F spaced apart from the upper surface of the finger board A, and with the strings of the instrument located as described, the fingers of the hand may be manipulated to produce tremulous or pulsating sound waves, when desired.

What I claim is:

1. In combination a finger board for stringed instruments; a covering therefor highly resilient and adapted to substantially return to normal shape when pressure of a finger is removed therefrom; the strings normally located beyond said covering, and spacing means located between said resilient covering and said finger board and positioned opposite the space separating adjacent strings, and substantially midway therebetween, and resting in contact with the outer surface of said finger board.

2. In combination a finger board for stringed instruments; a plurality of laterally spaced continuous projections associated therewith and extending longitudinally thereof, and a resilient covering for said finger board lying upon said spaced projections.

3. As a new article of manufacture, a finger board for stringed instruments having a resilient covering provided with a smooth outer surface, and means interposed between said finger board and the innerside of said covering to form spaced channels extending longitudinally of said board.

ALFRED DYER.